(12) United States Patent
Foglia

(10) Patent No.: US 11,147,414 B2
(45) Date of Patent: Oct. 19, 2021

(54) COFFEE MACHINE WITH SENSORS

(71) Applicant: SIMONELLI GROUP S.P.A., Belforte del Chienti (IT)

(72) Inventor: Simone Foglia, Macerata (IT)

( * ) Notice: Subject to any disclaimer, the term of this patent is extended or adjusted under 35 U.S.C. 154(b) by 117 days.

(21) Appl. No.: 16/613,654

(22) PCT Filed: Jun. 18, 2018

(86) PCT No.: PCT/EP2018/066122
§ 371 (c)(1),
(2) Date: Nov. 14, 2019

(87) PCT Pub. No.: WO2018/234241
PCT Pub. Date: Dec. 27, 2018

(65) Prior Publication Data
US 2020/0178725 A1    Jun. 11, 2020

(30) Foreign Application Priority Data

Jun. 21, 2017    (IT) .......................... 102017000069004

(51) Int. Cl.
*A47J 31/52*        (2006.01)
*A47J 31/46*        (2006.01)
(Continued)

(52) U.S. Cl.
CPC ........... *A47J 31/525* (2018.08); *A47J 31/461* (2018.08); *A47J 31/465* (2013.01); *A47J 31/468* (2018.08);
(Continued)

(58) Field of Classification Search
None
See application file for complete search history.

(56) References Cited

U.S. PATENT DOCUMENTS 8,790,513 B1 *    7/2014   Boulter .................... C02F 9/00
                                                    210/104
2006/0027267 A1 * 2/2006   Fritze ..................... F17D 5/02
                                                    137/487.5
(Continued)

FOREIGN PATENT DOCUMENTS

| CN | 106510471 A | 3/2017 |
| EP | 2316796 A2 | 5/2011 |
| WO | 2016045878 A1 | 3/2016 |

OTHER PUBLICATIONS

International Search Report for Corresponding PCT/EP2018/066122.
Written Opinion of the ISA for Corresponding PCT/EP2018/066122.

*Primary Examiner* — Richard C Gurtowski
(74) *Attorney, Agent, or Firm* — Egbert, McDaniel & Swartz, PLLC

(57) ABSTRACT

A coffee machine is disclosed having a water system intended to be connected to a water supply system, a filter unit disposed at the inlet of the water system, a pump, a tank disposed in the water system between the filter unit and the pump, a sensor unit disposed in the tank and suitable for measuring at least one quality parameter of the water contained in the tank, a monitoring unit electrically connected to the sensor unit to receive electrical signals that are indicative of the measured water quality parameters, transduce the electrical signals in numerical values and compare the numerical values of the measured parameters with preset threshold ranges, and a user interface operatively connected to the monitoring unit and having an alarm to indicate when a water parameter is out of the preset threshold range.

17 Claims, 3 Drawing Sheets

(51) Int. Cl.
*A47J 31/60* (2006.01)
*C02F 1/00* (2006.01)

(52) U.S. Cl.
CPC ........... *A47J 31/521* (2018.08); *A47J 31/605* (2013.01); *C02F 1/003* (2013.01); *C02F 1/008* (2013.01); *C02F 2209/055* (2013.01); *C02F 2209/06* (2013.01); *C02F 2209/07* (2013.01); *C02F 2209/10* (2013.01); *C02F 2209/29* (2013.01); *C02F 2307/12* (2013.01)

(56) References Cited

U.S. PATENT DOCUMENTS

| 2015/0201796 | A1* | 7/2015 | Kuempel | H04L 67/10 |
| | | | | 426/231 |
| 2015/0245736 | A1 | 9/2015 | Reyhanloo | |
| 2016/0209346 | A1* | 7/2016 | Brondum | G01N 27/4166 |
| 2017/0295991 | A1* | 10/2017 | Egli | A47J 31/60 |

* cited by examiner

COFFEE MACHINE WITH SENSORS

The present patent application for industrial invention relates to a coffee machine with sensors that are suitable for measuring water quality parameters.

The quality of the water used for making espresso coffee is extremely important in order to obtain a beverage with good organoleptic characteristics and to guarantee the efficient, reliable operation of the coffee machine over time.

Generally, the water used by the coffee machine is too rich in salts that impair both the taste of coffee and the operation of the machine.

An acceptable level of salts dissolved in water is currently maintained by means of water treatment elements, such as softeners and/or filters installed along a water system of the coffee machine. However, after a certain period of time, said filters and softeners no longer work properly and need to be replaced or regenerated. In fact, in case of an incorrect operation of the filtering elements, the typical problems related with the poor quality of the water contained in the coffee machine are encountered. These problems may include: excessive lime deposits, clogging of holes and conduits, reduced efficiency of the machine, alteration of the water flows with consequences on the correct extraction of the beverage.

The aforesaid clogging problems are very frequent in a coffee machine and require carrying out expensive and time-consuming maintenance operations in order to restore the perfect operating conditions of the coffee machine.

US2015245736 discloses a dispensing machine, such as for example a coffee machine which comprises a tank disposed in the water system, a filter disposed in the tank, first sensors disposed in the tank and suitable for measuring the level and/or the hardness of the water in the tank, and a second sensor disposed downstream the tank and suitable for measuring the hardness of the filtered water that comes out of the tank, in such a way as to compare this value with the hardness of the water introduced in the tank, which is measured by the first sensors. The filter is disposed in the tank, in downstream position relative to a servo valve, water transportation means and first sensors. Therefore, unfiltered water is introduced in the tank and filtered water is dispensed from the tank. Such an arrangement of the filter in the tank is impaired by the fact that the parts upstream the filter (servo valve, water transportation means, and first sensors) can get damaged by the water, especially in case of high hardness values.

Moreover, in order to decide if the filter needs to be changed, the machine compares the hardness of the unfiltered water measured by the first sensors in the tank with the hardness of the filtered water measured out of the tank by the second sensor. Such a solution is impaired by the fact that an additional sensor must be provided downstream the tank in order to detect the operation of the filter, thus increasing the cost and volume of the coffee machine.

Moreover, US2015245736 discloses sensors that are generic detectors of the water hardness (such as contact or electrode conductivity detectors) and measure only the total quantity of ions contained in the water, and not the specific quantity of the single ions contained in the water. However, the specific quantity of the single ions contained in the water can affect the taste of the coffee obtained with such water. Therefore, not being provided with specific sensors, such a machine has no information on the taste of coffee and provides no remedy to correct the taste of the coffee according to the specific quantity of the single ions contained in the water.

Moreover, US2015245736 discloses a machine provided with only one large tank that causes water stagnation.

The purpose of the present invention is to eliminate the drawbacks of the prior art by providing a coffee machine provided with sensors suitable for measuring the quality of the water in such a way as to replace the filtering elements of the machine, which is inexpensive, not cumbersome and resistant to damage caused by the water.

Another purpose of the invention is to provide such a coffee machine that is suitable for ensuring a good quality coffee.

An additional purpose is to provide a coffee machine that permits a water recirculation in the tank, in such a way as to avoid water stagnation.

A further purpose of the invention is to provide such a coffee machine that is efficient, effective and reliable over time.

These purposes are achieved according to the invention with the characteristics of the independent claim 1.

Advantageous embodiments of the invention appear from the dependent claims.

The coffee machine of the invention is defined by claim 1.

The advantages of the coffee machine according to the invention are manifest. In fact, the filter is installed upstream all parts of the water system, in such a way as to protect said parts from the action of the unfiltered water, and the sensor unit is disposed in the tank, downstream the filter, in such a way that the sensors disposed in the tank can measure the parameters of the filtered water.

The sensor unit measures the parameters of the water in the tank and the monitoring unit monitors the quality of the water by checking if the measured parameters are not comprised in the preset threshold ranges. When the measured parameters are not comprised in the preset threshold ranges, the user interface generates an alarm and the operator or technician is informed of the need to replace the filtering unit, in such a way as to restore the correct water parameters in the coffee machine.

Therefore, it is not necessary to install sensors upstream the filter, or to compare the parameters of the unfiltered water with the ones of the filtered water in order to measure the performance of the filter, as in the prior art. The water parameters can be measured in a simple way and the volume of the machine can be reduced.

Additional features of the invention will appear manifest from the detailed description below, which refers to merely illustrative, not limiting embodiments, wherein.

Figure 1:
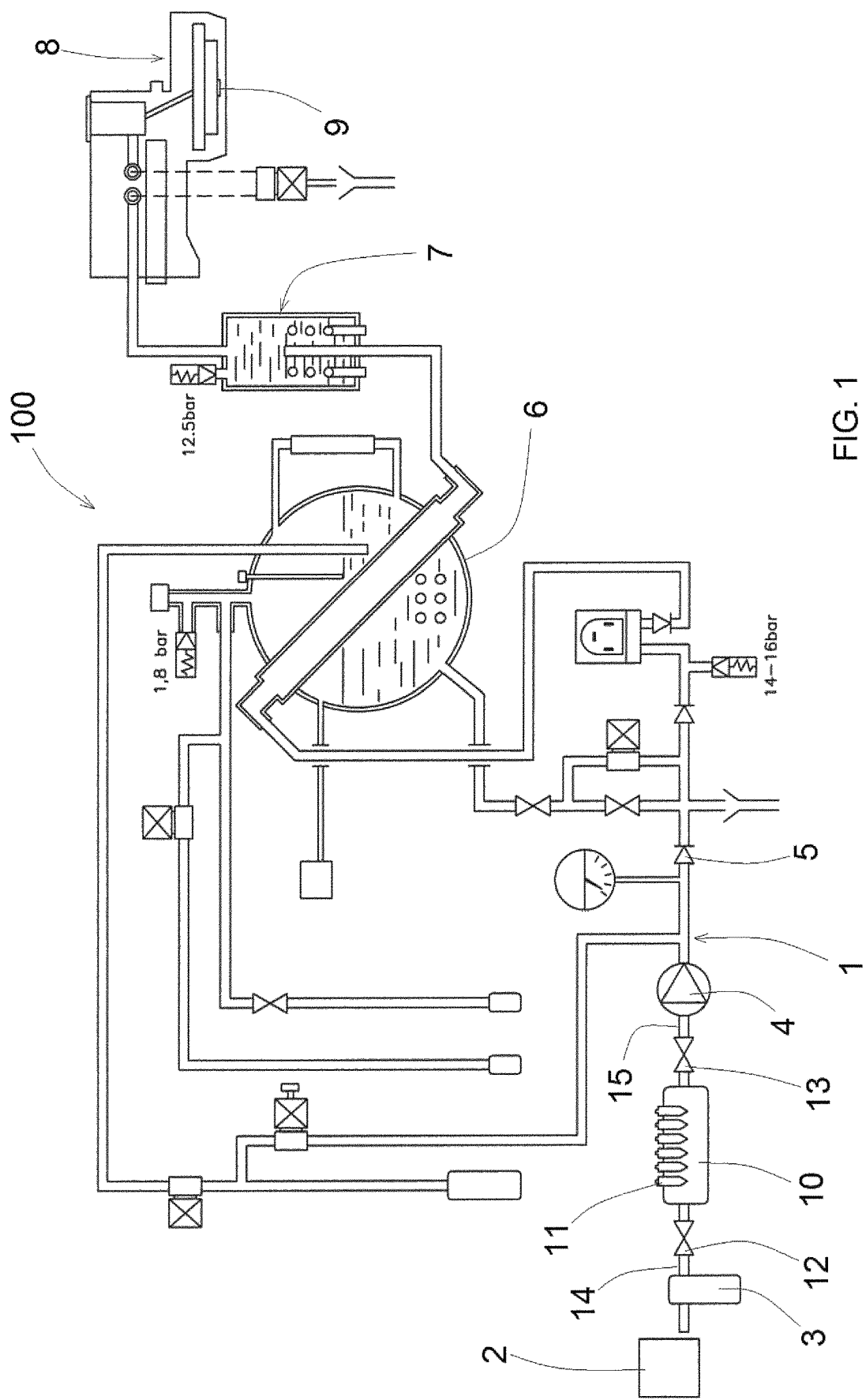
FIG. 1 is a water diagram of the coffee machine of the invention.

With reference to the Figures, the coffee machine of the invention is described, which is generally indicated with reference numeral (100).

As shown in FIG. 1, the coffee machine (100) comprises a water system (1) connected to a water supply system (2).

A filter unit (3) is disposed in the water system (1), more precisely at the inlet of the water system (1). The filter unit (3) may comprise one or more filtering systems of potable water, of known type, such as inverse osmosis filters, active carbon filters, UV filters, softeners, and the like.

Because of the provision of the filter unit (3) in the inlet of the water system, all parts of the water system are installed downstream the filter, and therefore, are not damaged by the corrosive action of the unfiltered water.

A pump (4) is disposed in the water system (1) to provide a water flow with a pressure of approximately 14-16 bars.

A check valve (5) is disposed in the water system (1) downstream the pump (4).

A boiler (6) is disposed in the water system (1) to store preheated water.

A heater (7) is installed in the water system (1) downstream the boiler (6) to heat the water at an ideal temperature for extracting the coffee.

The heater (7) is connected to a dispensing unit (8) provided with dispensing nozzles (9) to dispense hot water. A filter-holder (not shown) which contains coffee powder is applied to the dispensing unit (8), in such a way that the hot water coming out of the dispensing nozzles (9) passes through the coffee powder contained in the filter holder, extracting the beverage.

The description of the water system only has an illustrative purpose, and the water system may change according to the type of coffee machine.

According to the invention, a tank (10) is disposed in the water system (1) upstream the pump (4) and downstream the filter unit (3). A sensor unit (11) is disposed in the tank (10) in order to measure at least one quality parameter of the water contained in the tank (10), i.e. at least one quality parameter of the filtered water.

The water system (1) comprises an inlet tap (12) and an outlet tap (13) disposed at the inlet and at the outlet of the tank (10). The inlet tap and the outlet tap (12, 13) are used to isolate the tank (10) from the water system in order to maintain the sensor unit (11).

The position of the tank (10) has been studied to provide the easy connection of a tube (14) coming from the filter unit (3) with the inlet tap (12) of the tank.

The outlet tap (13) of the tank is connected to the pump (4) with a flexible hose (15) in order to guarantee that the quality parameters of the water contained in the tank (10) are measured before the water enters in contact with the operating parts of the water system (1) of the machine, causing damage in case of incorrect water parameters.

The tank (10) contains cold water (water inlet temperature), in such a way that the sensor unit (11) can detect the water parameter in a stable condition.

Moreover, the sensor unit (11) measures the water parameters in a continuous way when the water passes through the tank (10).

The sensor unit (11) may comprise one or more of the following six sensors:
conductivity or TDS (total dissolved solid) meter;
PH detector;
alkalinity detector;
calcium detector;
magnesium detector;
chlorine salt detector.

When the sensor unit comprises six sensors, the capacity of the tank (10) is about 300-600 ml, preferably 500 ml in order to house the six sensors. However, such a large tank may be impaired by some drawbacks.

Figure 2:
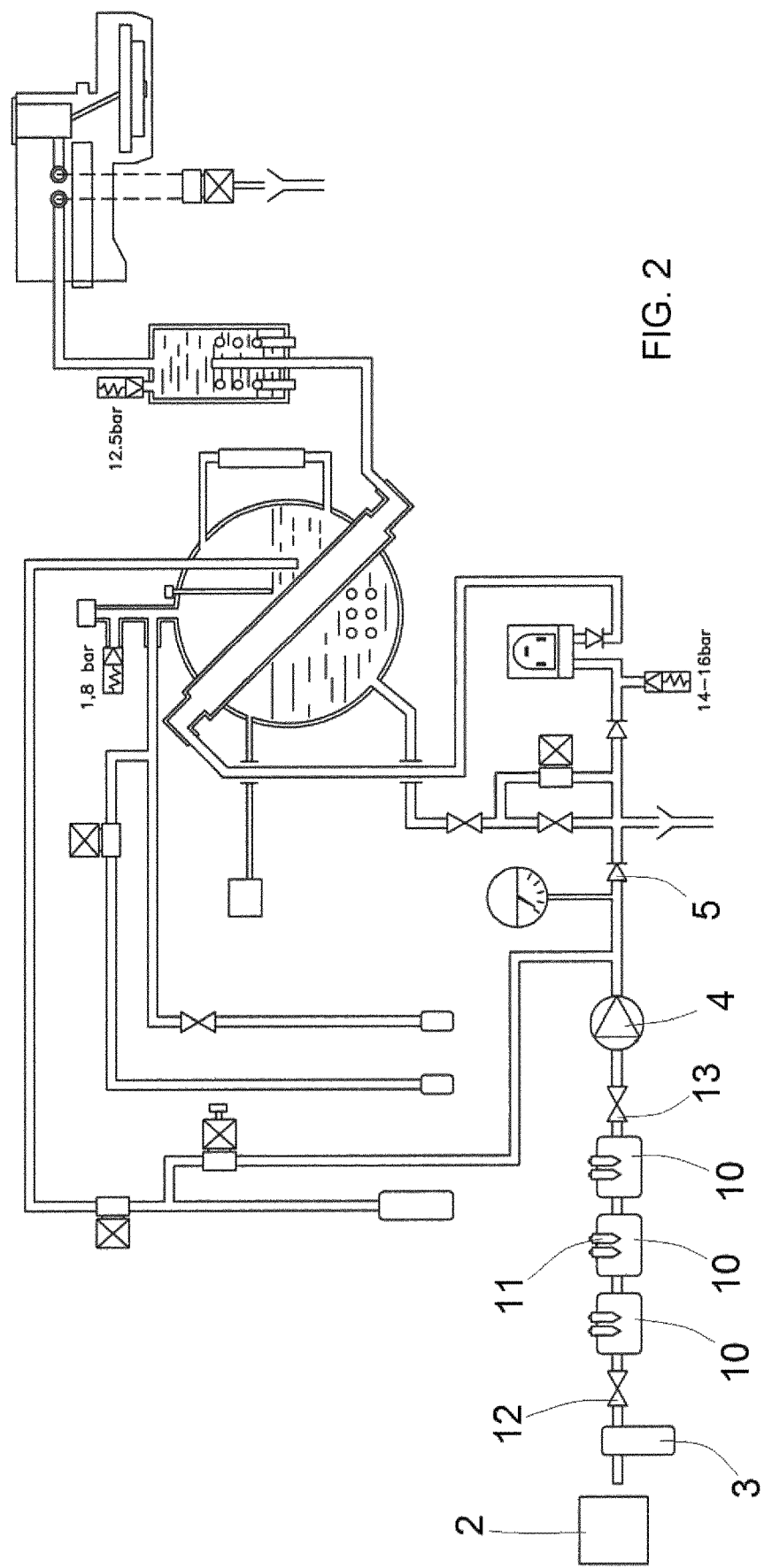
FIG. 2 is a variant of the water diagram of FIG. 1.

FIG. 2 shows a variant provided with three tanks (10) disposed in series. In such a case, the inlet tap (12) is disposed at the inlet of the first tank and the outlet tap (13) is disposed at the outlet of the last tank.

Each tank (10) is provided with the sensor unit (11). In this case, the sensor unit (11) of each tank is only formed of two sensors.

Each tank (10) has a capacity of 80-120 mm, preferably 100 ml, which is equal to the volume of water that is needed for dispensing 2 doses of espresso coffee. Such a quantity has been calculated to guarantee a frequent water exchange in the tank (10) and obtain precise measurements of the water passing through the tank.

Dimensions of the tank (10) lower than 80 ml would cause an excessive water flow in the tank and an incorrect measurement of the water parameters.

Dimensions of the tank (10) higher than 120 ml would cause water stagnation in the tank, with deposits of minerals that would impair the measurement of the water parameters. With a tank capacity of 100 ml, the water in the tank is replaced completely after dispensing two doses of espresso coffee.

Figure 3:
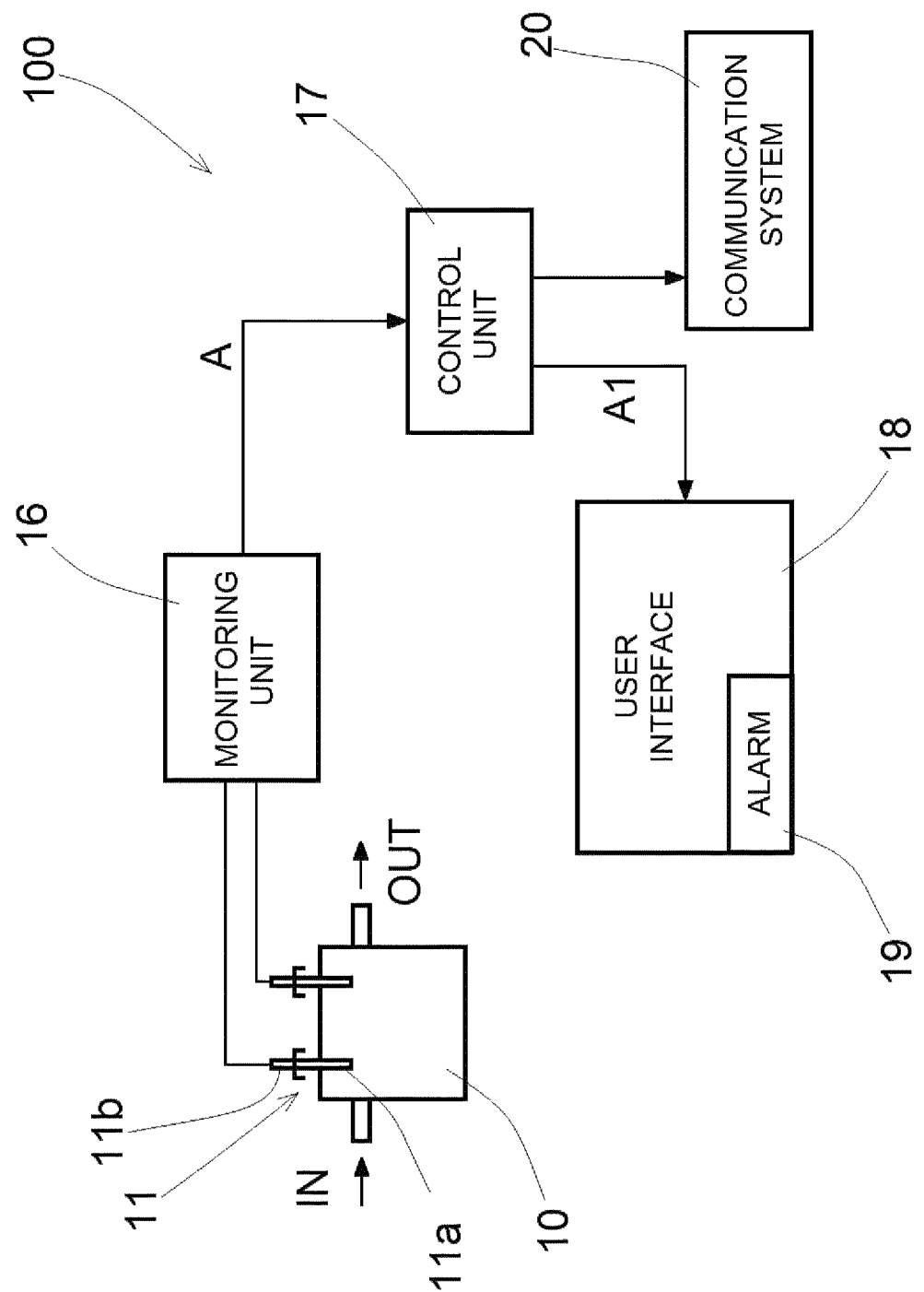
FIG. 3 is a block diagram that shows the electrical connection of the sensors of the coffee machine according to the invention.

As shown in FIG. 3, each sensor of the sensor unit (11) has a sensitive part (11a) disposed inside the tank (10) in contact with the water inside the tank (10), and an electrical part (11b) disposed outside the tank.

The sensitive part of the TDS meter is a conductivity meter.

The sensitive part of the PH detector is an $H^+$ (hydrogen ion) accumulation electrode.

The sensitive part of the alkalinity detector is a $CO_3^-$ (carbonate ion) and $HCO_3^-$ (bicarbonate ion) accumulation electrode.

The sensitive part of the calcium detector is a $CA^{++}$ (calcium ion) accumulation electrode.

The sensitive part of the magnesium detector is an $Mg^+$ (magnesium ion) accumulation electrode.

The sensitive part of the chlorine salt detector is a $Cl^-$ (chlorine ion) accumulation electrode.

The electrical part (11b) of the sensors of the sensor unit (11) is electrically connected to a monitoring unit (16).

The monitoring unit (16) is connected to a control unit (17) of the coffee machine (100) that controls the operation of the coffee machine.

The control unit (17) is connected to a user interface (18).

The monitoring unit (16) receives electrical signals from the sensor unit (11) that are indicative of the parameters measured by the sensors, and transduces said electrical signals in numerical parameter values. The monitoring unit (16) compares the parameter values measured by the sensors with the threshold ranges that are stored in the monitoring unit (16) or in the control unit (17).

The provision of a sensor unit (11), which comprises specific sensors (PH detector; alkalinity detector; calcium detector; magnesium detector; chlorine salt detector) permits to measure the specific quantity of the single ions contained in the water, in such a way as to have specific information on the taste of the coffee, which is affected by said specific ions dissolved in the water.

According to the Italian legislation, the pH of potable water must be comprised between 6.5 and 9.5. Instead, the SCAE water booklet (Wellinger et al., ZHAW), which is the reference literature for professional bartenders at world level, suggests a PH range of 6-8 in order to obtain good coffee. Therefore, the PH threshold range is set as 6.5-8.

Generally, coffee machines are supplied with an instructions manual that recommends a TDS value comprised between 50 and 250 ppm; whereas according to SCAE, in order to obtain a good espresso coffee, the TDS values must be comprised between 90 and 150 ppm. Therefore, the 90-150 ppm range is set as TDS threshold value. In fact, TDS values lower than 90 ppm would make the water too low in minerals, this being a favorable condition in terms of maintenance, but an unfavorable condition for the quality and taste of the coffee. On the contrary, TDS values higher than 150 ppm are dangerous for the maintenance of the machine because of the higher mineral deposits that can clog the small passages of the water system, but are a favorable condition in terms of coffee taste. Therefore, in such a case, a compromise was found on the threshold range.

The alkalinity threshold range is comprised between 10 and 150 ppm. Although no restrictions are imposed by the law, alkalinity is an important indication of the quantity of Carbonates and Bicarbonates contained in the water.

As it is known, the Calcium and Magnesium ions are responsible for the total hardness of potable water. Recent studies have shown that with the same hardness of the water (which is expressed in French degrees—° F.), the quality of the coffee can be very different if the hardness is prevalently given by Calcium Salts and Magnesium Salts. Therefore, by monitoring these two parameters, not only it is possible to have information on the total hardness of the water, but it is also possible to have accurate information on the inlet water and on its contents of Calcium Salts or Magnesium Salts.

A threshold range for water hardness can be set, for instance, between 7° and 22° F., along with single threshold ranges for the quantity of the single Calcium Salts and Magnesium Salts.

Chlorine Salts affect the taste of coffee. Therefore, a threshold range of chlorine salts can be set in order to obtain the best coffee. For example, a chlorine range comprised between 0.05 and 0.1 mg/L is set.

When the parameters measured by the sensor unit (11) are not comprised in the preset threshold ranges, the monitoring unit (16) sends an alarm signal (A) to the control unit (17), indicating which parameter is out of the threshold range.

The control unit (17) processes the alarm signal (A) and sends a corresponding alarm signal (A1) to the user interface (18) that activates an alarm (19) of visual and/or acoustic type. The alarm (19) is perceived by the user, who is informed that at least one water parameter is not comprised in the preset threshold range and the filter unit (3) needs to be changed in order to restore the correct quality of the water in the coffee machine and consequently the correct operation of the machine and the good quality of the beverage.

In view of the above, in order to measure the performance of the filter, it is simply necessary to provide a single sensor unit (11) in the tank, in such a way as to detect only the parameters of the filtered water. Therefore, it is not necessary to provide sensors upstream the filter or to compare the parameters of the unfiltered water with the parameters of the filtered water, thus saving on costs and volume compared to the machines of the prior art.

When the user or the maintenance operator changes the filter unit (3), the alarm signal can be canceled by means of the user interface (18). In any case, since the filter unit (3) has been changed, the parameters of the water are now comprised in the preset threshold ranges.

The alarm (19) can be a display with information on the parameter or parameters not comprised in the threshold range.

Advantageously, the coffee machine (100) comprises a communication system (20) that is suitable for remotely transmitting data, for example, to a device of the maintenance operator in charge of the coffee machine. In view of the above, the maintenance operator will receive exact information on the parameters that are not comprised in the preset ranges and will replace the filtering unit (3) with a filtering unit that is suitable for bringing the water back to the preset threshold ranges.

In particular, when the control unit (17) receives an alarm signal (A) from the monitoring unit (16), the control unit (17) will store the date on which the parameter was out of the preset threshold range. So, the control unit (17) will store the days on which the machine has operated with water parameters out of the preset threshold range before the replacement of the filtering unit. In this way, the maintenance operator can determine the period of time in which the machine did not operate in the conditions requested by the manufacturer.

FIG. 3 shows an embodiment wherein the monitoring unit (16) is connected to the control unit (17) of the machine and the control unit (17) of the machine is connected to the user interface (18) of the machine.

However, the monitoring unit (16) may be embedded in the control unit (17) of the machine.

Alternatively, the monitoring unit (16) can be directly connected to the user interface (18) of the machine or to an independent user interface exclusively dedicated to monitoring the water parameters. In such a case, the monitoring unit must be provided with CPU, memory and communication system independently from the control unit of the machine.

Numerous equivalent variations and modifications can be made to the present embodiments of the invention, which are within the reach of an expert of the field, falling in any case within the scope of the invention.

The invention claimed is:

1. A coffee machine comprising:
   a water system adapted to be connected to a water supply;
   a filter unit disposed at an inlet of said water system, said filter unit adapted to filter water;
   a pump installed in said water system and adapted to pressurize a water flow;
   a heater installed in said water system and adapted to heat the water to a temperature suitable for extracting coffee from ground coffee beans;
   a dispensing unit connected to said heater, said dispensing unit having dispensing nozzles, said dispensing unit adapted to dispense hot water through the dispensing nozzles;
   at least one tank disposed in said water system between said filter unit and said pump;
   a sensor unit installed in said at least one tank, said sensor unit adapted to detect at least one quality parameter of water contained in said at least one tank;
   a monitoring unit electrically connected to said sensor unit so as to receive electrical signals indicative of the at least one quality parameter, said monitoring unit transducing the electrical signals into numerical values and comparing the numerical values of at least one measured quality parameter with preset threshold ranges;
   a user interface operatively connected to said monitoring unit, said user interface having an alarm indicative of when the at least one measured quality parameter is outside of the preset threshold ranges, wherein said filter unit is disposed at the inlet of said water system so as to protect the water system from an action of unfiltered water, said at least one tank being disposed between said filter unit and said pump such that said sensor unit measures the at least one quality parameter of filtered water.

2. The coffee machine of claim 1, wherein said sensor unit has a conductivity meter, the preset threshold ranges being between 90 and 150 parts per million of total dissolved solids.

3. The coffee machine of claim 2, wherein said sensor unit has a calcium detector and a magnesium detector.

4. The coffee machine of claim 2, wherein said sensor unit has a pH detector, the preset threshold ranges being a pH range of between 6.5 and 8.

5. The coffee machine of claim 2, wherein said sensor unit has an alkalinity detector, the preset threshold ranges being an alkalinity range from 10 to 150 parts per million.

6. The coffee machine of claim 2, wherein said sensor unit has a chlorine detector, the preset threshold ranges being a chlorine range of between 0.05 and 0.1 mg/L.

7. The coffee machine of claim 2, further comprising:
an inlet tap disposed at an inlet of said at least one tank; and
an outlet tap disposed at an outlet of said at least one tank.

8. The coffee machine of claim 2, wherein said at least one tank comprises three tanks arranged in series, each of the three tanks having said sensor unit.

9. The coffee machine of claim 8, wherein each of the three tanks has a volume of between 80 and 120 milliliters.

10. The coffee machine of claim 2, wherein said monitoring unit and said user interface are connected to a control unit, the control unit adapted to control an operation of the coffee machine.

11. The coffee machine of claim 2, further comprising:
a communication system connected to said monitoring unit so as to send data remotely to a device of a user.

12. An operating method using the coffee machine of claim 1, the operating method comprising:
measuring the at least one quality parameter of the water contained in said at least one tank;
comparing the measured quality parameter with the preset threshold ranges;
generating an alarm when the measured quality parameter is out of the preset threshold ranges; and
replacing said filter unit after the alarm is generated.

13. The operating method of claim 12, wherein the at least one quality parameter is total dissolved solids, the preset threshold ranges being a total dissolved solids range of between 90 and 150 parts per million.

14. The operating method of claim 12, wherein the at lest one quality parameter is a presence of calcium and magnesium.

15. The operating method of claim 12, wherein the at least one quality parameter is a pH, the preset threshold ranges being a pH range between 6.5 and 8.

16. The operating method of claim 12, wherein the at least one quality parameter comprises alkalinity, the preset threshold ranges being an alkalinity range of between 10 and 150 parts per million.

17. The operating method of claim 12, wherein the at least one quality parameter comprises a presence of chlorine, the preset threshold ranges being a chlorine range of between 0.05 and 0.1 mg/1.

* * * * *